United States Patent
Tsui et al.

(10) Patent No.: US 8,217,637 B2
(45) Date of Patent: Jul. 10, 2012

(54) FREQUENCY COMPENSATION BASED ON DUAL SIGNAL PATHS FOR VOLTAGE-MODE SWITCHING REGULATORS

(75) Inventors: Yip Sum Tsui, Tsing Yi (HK); Ying Wu, Mongkok (HK); Kwok Tai Philip Mok, Clear Water Bay (HK)

(73) Assignee: The Hong Kong University of Science and Technology, Hong Kong (HK)

( * ) Notice: Subject to any disclaimer, the term of this patent is extended or adjusted under 35 U.S.C. 154(b) by 639 days.

(21) Appl. No.: 12/346,185

(22) Filed: Dec. 30, 2008

(65) Prior Publication Data

US 2009/0174383 A1 Jul. 9, 2009

Related U.S. Application Data (60) Provisional application No. 61/009,964, filed on Jan. 7, 2008.

(51) Int. Cl.
*G05F 1/00* (2006.01)
(52) U.S. Cl. .................................... 323/282
(58) Field of Classification Search .......... 323/282–286, 323/351, 222
See application file for complete search history.

(56) References Cited

U.S. PATENT DOCUMENTS

| | | |
|---|---|---|
| 4,047,126 A | 9/1977 | Anderson |
| 4,811,236 A | 3/1989 | Brennen et al. |
| 4,812,719 A | 3/1989 | Stephens et al. |
| 4,823,070 A | 4/1989 | Nelson |
| 4,888,821 A | 12/1989 | Hamp, III et al. |
| 4,975,949 A | 12/1990 | Wimsatt et al. |
| 5,422,562 A | 6/1995 | Mammano et al. |
| 5,506,496 A | 4/1996 | Wrathall et al. |
| 5,514,947 A | 5/1996 | Berg |
| 5,559,424 A | 9/1996 | Wrathall et al. |
| 5,596,265 A | 1/1997 | Wrathall et al. |
| 5,610,501 A | 3/1997 | Nelson et al. |
| 5,648,718 A | 7/1997 | Edwards |
| 5,739,681 A | 4/1998 | Allman |
| 5,852,359 A | 12/1998 | Callahan, Jr. et al. |
| 5,929,620 A | 7/1999 | Dobkin et al. |

(Continued)

FOREIGN PATENT DOCUMENTS

EP  0 082 029 B1  9/1985

(Continued)

OTHER PUBLICATIONS

Mattingly, Doug "Designing Stable Compensation Networks for Single Phase Voltage Mode Buck Regulators" *Intersil Technical Brief* (Dec. 2003).

(Continued)

*Primary Examiner* — Adolf Berhane
*Assistant Examiner* — Yemane Mehari
(74) *Attorney, Agent, or Firm* — Leydig, Voit & Mayer, Ltd.

(57) ABSTRACT

A frequency compensation method for voltage-mode switching regulators is disclosed. A lowpass filter and a bandpass filter are employed in the two signal paths into the dual inputs of PWM comparators. In one embodiment, two zeros are generated to compensate for the L-C output filter poles. Stable operation, low output voltage ripple and fast load transient response are achieved; while the power consumption of error amplifier and the area for implementing on-chip passive components are greatly reduced.

15 Claims, 12 Drawing Sheets

U.S. PATENT DOCUMENTS

| | | | |
|---|---|---|---|
| 5,959,852 A | | 9/1999 | Deloy et al. |
| 6,064,187 A | * | 5/2000 | Redl et al. ............ 323/285 |
| 6,198,265 B1 | | 3/2001 | Stevenson |
| 6,304,067 B1 | | 10/2001 | Wrathall |
| 6,366,070 B1 | | 4/2002 | Cooke et al. |
| 6,424,132 B1 | | 7/2002 | Wrathall |
| 6,456,050 B1 | | 9/2002 | Agiman |
| 6,522,116 B1 | | 2/2003 | Jordan |
| 6,661,210 B2 | | 12/2003 | Kimball et al. |
| 6,670,796 B2 | * | 12/2003 | Mori ............ 323/282 |
| RE39,065 E | | 4/2006 | Nelson |
| 7,126,318 B2 | | 10/2006 | Oswald et al. |
| 7,145,317 B1 | | 12/2006 | Shah |
| 7,170,264 B1 | * | 1/2007 | Galinski ............ 323/222 |
| 7,250,812 B2 | | 7/2007 | Frech et al. |
| 7,268,526 B1 | | 9/2007 | Smith |
| 7,312,659 B1 | * | 12/2007 | Aram ............ 330/253 |

FOREIGN PATENT DOCUMENTS

| | | |
|---|---|---|
| EP | 0 491 766 B1 | 6/1995 |
| EP | 0 789 865 B1 | 11/2000 |
| EP | 1 215 807 B1 | 5/2006 |
| EP | 1 387 478 B1 | 9/2006 |

OTHER PUBLICATIONS

Wu et al. "Comparative Studies of Common Control Schemes for Reference Tracking and Application of End-Point Prediction" *IEEE Custom Integrated Circuits Conference* (2007).

Keskar et al., "A High Bandwidth, Bypass, Transient-Mode Sigma-Delta DC-DC Switching Boost Regulator with Wide LC Compliance," *IEEE*, 543-548 (copyright 2005).

Lee et al., "An SC Voltage Doubler with Pseudo-Continuous Output Regulation Using a Three-Stage Switchable Opamp," *IEEE Journal of Solid-State Circuits*, 42(6): 1216-1229 (Jun. 2007).

Shi et al., "A Highly Integrated Power Management IC for Advanced Mobile Applications," *IEEE Journal of Solid-State Circuits*, 42(8): 1723-1731 (Aug. 2007).

Maranesi et al., "The incremental voltage control mode for PWM regulators," 19th Annual IEEE Power Electronics Specialists Conference 1988 (PESC '88 Record), 1: 549-554 (Kyoto, Japan, Apr. 11-14, 1988).

* cited by examiner

FREQUENCY COMPENSATION BASED ON DUAL SIGNAL PATHS FOR VOLTAGE-MODE SWITCHING REGULATORS

CROSS-REFERENCE TO RELATED APPLICATIONS

This patent application claims the benefit of U.S. Provisional Patent Application No. 61/009,964, filed Jan. 7, 2008, which is incorporated herein by reference in its entirety.

FIELD OF THE INVENTION

This invention relates generally to a methodology and circuit for synthesizing appropriate compensation response to linear circuits; and more particularly to switching regulators using dual signal paths into pulse-width modulation (PWM) comparators and a built-in summation function of a PWM comparator.

BACKGROUND OF THE INVENTION

Switching regulators are widely used in modern portable devices due to their high power conversion efficiency. Fixed-switching-frequency PWM voltage-mode control and current-mode control are the two main control schemes typically used. Compared to the current-mode control, voltage-mode control has the advantage of less sophisticated control circuitries, lower noise sensitivity, and potentially higher power efficiency due to the absence of accurate and fast current sensing and processing. Hence, it is a popular choice especially in single-output switching power supplies. Furthermore, in applications where large load current transient occurs and fast dynamic response is required, compensation methods with wide bandwidth are preferred, implying that Type II or Type III compensation is usually employed to extend the loop gain crossover frequency.

Another trend in power supply design in portable devices is the small form factor to fit in the limited physical space. Hence, small ceramic capacitors are gaining popularity to replace the bulky electrolytic capacitors as output filters of switching regulators. A ceramic capacitor has a much smaller equivalent series resistance (ESR) than its electrolytic counterparts. The resultant ESR-zero introduced in the loop gain is now pushed to higher frequency so that Type II compensation may not be enough to maintain adequate stability in the control loop. Type III compensation is hence the choice in many systems which demand high efficiency, fast bandwidth and compact form factor.

Nonetheless, the passive components of Type III compensator such as resistors and capacitors are often implemented off-chip. While this may give more design flexibility to some customers, it can be an obstacle to further squeezing the size of the power regulator, as there can be more than half a dozen of passive components required. On the other hand, integrating the passive components on-chip can be costly due to their large size required for generating zeros at low frequency. Moreover, the required high gain-bandwidth of the error amplifier driving the compensator is undesirable since it consumes considerable amount of power in the control circuitry.

Thus, there is a need for a compensation methodology that can generate the necessary zeros for compensation and yet has smaller area and power consumption requirements that allow for on-chip integration.

BRIEF SUMMARY OF THE INVENTION

Embodiments of the invention are based on the recognition that the frequency response of a Type III compensator is essentially composed of a low frequency portion and a high frequency portion. The former is like a lowpass filter with frequency response like that of an integrator; while the latter is like a bandpass filter with or without low-frequency gain. Since high low-frequency gain and low crossover frequency is the case in the lowpass filter, but the opposite is in the case of bandpass filter, breaking down the frequency response of the entire Type III compensator into two portions, implementing them separately and combing them together may lead to certain advantages in circuit design.

Another breakthrough comes from the method of combining the two portions of the frequency response. The most straight-forward approach is to cascade two filters in a single signal path, which will result in the unchanged zero and pole locations assuming negligible loading effect from the next stage. The preferred approach is to parallel two filters and add their responses by making use of the dual signal paths inherently present in a PWM comparator (i.e., the two inputs of the PWM comparator). The PWM comparator compares the two inputs and automatically provides the function of summation (with one input inverted) for two signal paths. This approach results in summation of transfer functions of two signal paths, and leads to shifting of zero locations, which may be exploited in circuit design for some beneficial outcomes, such as reduction of the size of required passive components and/or the reduction of bandwidth of some active circuits. Hence, the improved compensator relies on the summation of a lowpass filter and a bandpass filter.

Another potential benefit of paralleling two filters is that a zero can be generated at the location where an asymptote with negative slope in the magnitude plot of a filter intersects another asymptote with null slope of the other filter. Since such a zero is generated by the summation of two filters' frequency response, it does not need to be generated by purpose using passive components. The area of implementing passive components may be further reduced.

In one embodiment of the invention, the regulator comprises a power stage including two or more power semiconductor devices, one or more inductors and one or more capacitors, said stage providing a regulator output with regulated voltage. One or more power-transistor digital drivers turn on and off the power semiconductor devices to control the duty-ratio (D) of the power stage. In voltage-mode control, a logic block generates the duty-ratio signal in response to a periodic clock signal from clock generator, and the reset signal from the PWM comparator. In one embodiment, the PWM comparator has two inputs, one being the lowpass filter's output; while the other being the sum of bandpass filter's output and a ramp signal from the ramp generator, which is often implemented in the same block as the clock generator. The PWM comparator compares its two inputs and produces the reset signal. The input of the bandpass filter is the scaled version of the regulator's output voltage (i.e., the output of power stage); while the input of the lowpass filter is both the scaled version of regulator's output voltage and a reference voltage. In this way, the feedback loop is closed and regulator regulates the output voltage to a pre-defined ratio of reference voltage.

In one implementation of the above embodiment, the lowpass filter is formed by a transconductance amplifier driving an on-chip MOS capacitor. The lowpass filter is also called an error amplifier in classical power electronics. The bandpass filter includes an amplifier, a buffer transistor, a PMOS current mirror, a first resistor, a second resistor, a third resistor and a capacitor. The non-inverting input of amplifier receives the scaled version of regulator's output voltage and drives the gate of buffer transistor. The drain terminal of buffer transistor is coupled to the input terminal of PMOS current mirror, and its source terminal is coupled to the first resistor. The other terminal of the first resistor is coupled to ground. The second resistor is coupled between the source terminal of buffer transistor and the inverting input of amplifier. The third resistor is coupled between the inverting input of amplifier and one terminal of the capacitor, while the other terminal of the capacitor is coupled to ground. The output of PMOS current mirror is the output terminal of this bandpass filter and gives current output instead of voltage output.

In another implementation of the above embodiment, same circuit topology is employed, except that a fourth resistor is coupled between the inverting input of amplifier and the ground. This resistor, in conjunction with the second resistor, gives a particular dc gain of bandpass filter when desired.

The present invention is better understood upon consideration of the detailed description below and the accompanying drawings.

BRIEF DESCRIPTION OF THE DRAWINGS

While the appended claims set forth the features of the present invention with particularity, the invention and its advantages are best understood from the following detailed description taken in conjunction with the accompanying drawings, of which:

DETAILED DESCRIPTION OF THE INVENTION

The following examples further illustrate the invention but, of course, should not be construed as in any way limiting its scope.

Figure 1:
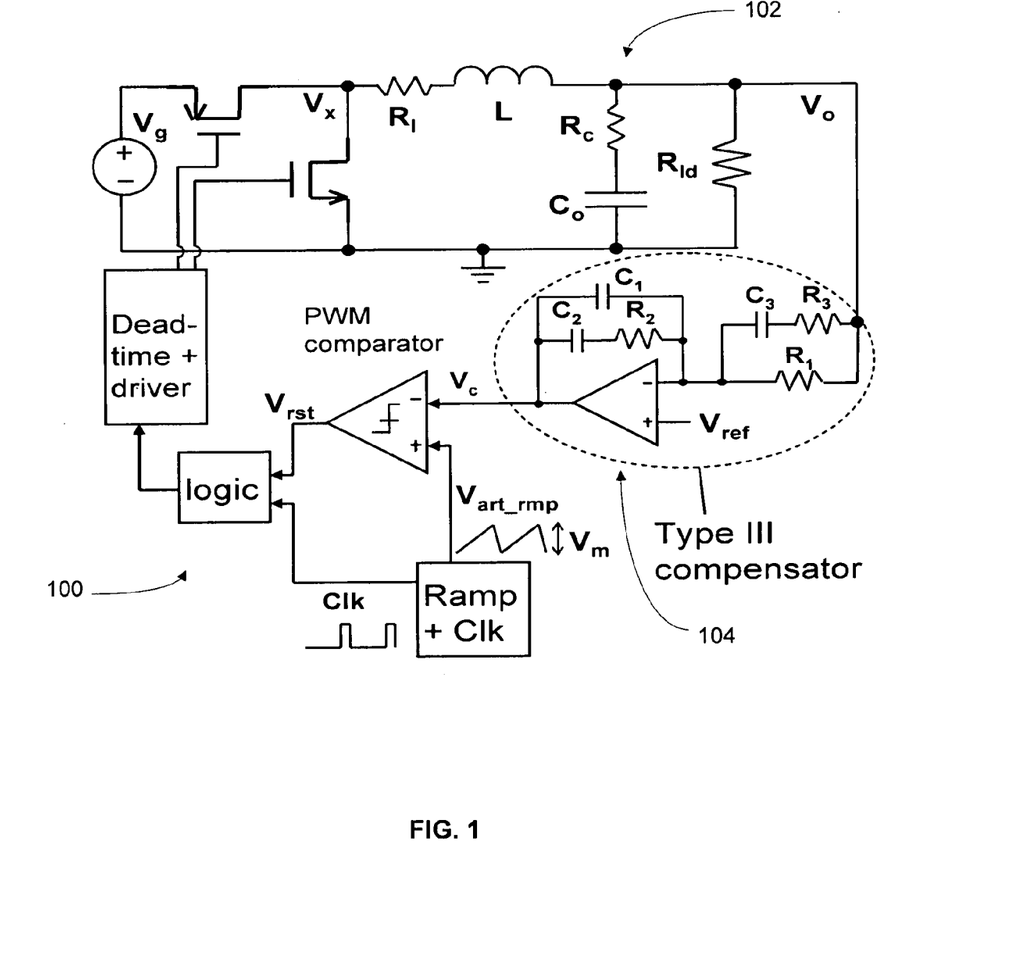
FIG. 1 is a diagram illustrating a Type-III compensated voltage-mode Buck regulator.
Figure 2:
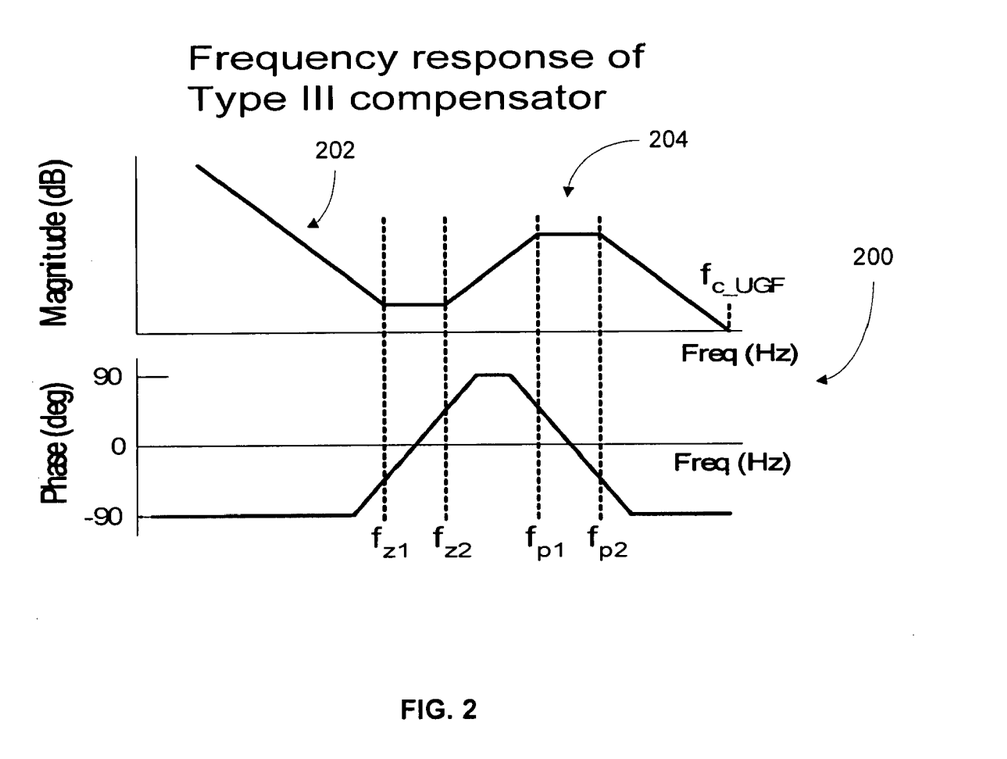
FIG. 2 is a diagram illustrating a bode plot of the Type-III compensator of FIG. 1.
Figure 3:
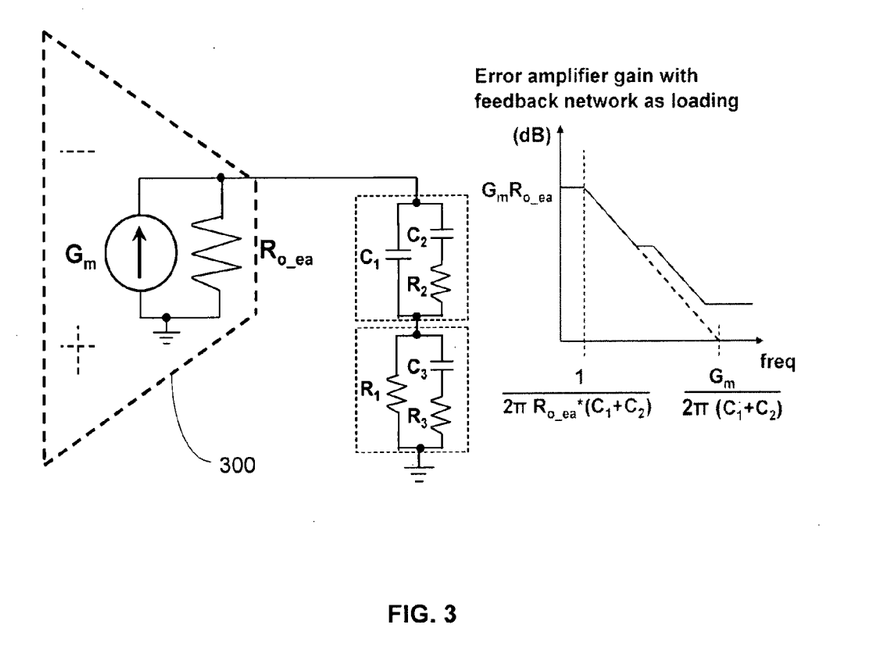
FIG. 3 is a diagram of a model of the amplifier and load in Type-III compensator of FIG. 1 and its open-loop gain versus frequency plot.

With reference to FIGS. 1-3, a brief theory of Type III compensation is explained using a Buck converter 100 illustrated in FIG. 1 as an example. Since there is a complex pole due to the L-C output filter 102 of the Buck converter 100, phase lag increases sharply at the complex pole frequency, $f_{LCo}$. The loop gain crossover frequency must be limited to one-tenth of $f_{LCo}$ to ensure enough phase margin if integrator type compensator (Type I) is used. Type III compensation is often employed to extend the crossover frequency and improve the phase margin of the loop gain. It generates two zeros to provide phase boost and offsets the complex pole phase lag. In this way, the crossover frequency can be extended beyond $f_{LCo}$ (still limited to ~20% of switching frequency for a robust system).

FIG. 2 shows the frequency response 200 of a Type III compensator 104. It can be seen that two zeros and two high-frequency poles are generated by three pairs of resistors and capacitors. Their locations are given by:

$$\omega_{z1} = \frac{1}{R_2 C_2} \quad (1(a))$$

$$\omega_{z2} = \frac{1}{(R_1 + R_3)C_3} \quad (1(b))$$

$$\omega_{p1} = \frac{1}{R_2(C_1 \| C_2)} \quad (1(c))$$

$$\omega_{p2} = \frac{1}{R_3 C_3} \quad (1(d))$$

It should be noted that f and ω are frequency in Hz and the angular frequency, respectively. The former is used in bode plots for easy reference to switching frequency, while the latter is used in equations for direct expression in s-domain transfer function. Besides the two poles as shown in 1(c) and 1(d), there is in fact a very low frequency dominant pole, $\omega_{p0}$, whose actual location highly depends on the error amplifier's dc gain.

Several considerations for integrating the entire compensator on-chip are discussed next. First, the size of passive components is estimated. It should be noted that $R_3$ is much smaller than $R_1$; and $C_1$ is much smaller than $C_2$ since $R_3$ and $C_1$ are used for generating high-frequency poles. For a power stage with 4.7 µH inductor and 4.7 µF output capacitor with 40 mΩ ESR running at 1 MHz switching frequency ($f_s$), $f_{LCo}$ and $f_{esr}$ are at ~34 kHz and ~850 kHz, respectively. There are different approaches for placing the two zeros in different literature. As a rough estimate, if $f_{z1}$ is placed at $0.5 \times f_{LCo}$ and $f_{z2}$ at $f_{LCo}$ as suggested in Intersil's online document "*Designing Stable Compensation Networks For Single Phase Voltage Mode Buck Regulators*," which is available at http://www.intersil.com/data/tb/tb417.pdf. $R_1$, $R_2$, $C_3$, $C_2$ can be assigned to be 100 kΩ, 100 kΩ, 48 pF, and 96 pF, respectively. These values can be implemented on-chip; yet the area occupied would be quite large. Meanwhile, the two poles are usually put at $f_{esr}$ and $0.5 f_s$, to cancel the gain-margin-reducing effect of ESR-zero, and to attenuate the compensator gain at switching frequency for reducing system noise sensitivity. In the design with small-ESR capacitor used, ESR-zero is at high frequency. The resulting $R_3$ (or $C_1$) is very small and the ratio between large components ($R_1$, $R_2$, $C_2$, $C_3$) and small components ($R_3$ and $C_1$) is then large. If a minimum size constraint exists for the small components (e.g., for not being significantly affected by the parasitics on-chip), the resultant large components may need to be further increased in size to keep the same ratio to the small components.

Another concern for integrating the passive components on-chip is the process variation. Since the resistors should be made of the same material for better matching (so are the capacitors), the zeros and poles will move in the same direction in a particular process corner. The worst case is that all zeros and poles move to the higher frequencies. This may considerably reduce the phase boost provided in Type III compensator 104. Hence, the designer may need to use passive components that are larger than nominal values to cope with the worst case scenario.

The requirement of gain-bandwidth of error amplifier is another concern. The compensator's gain at high frequencies (i.e., between $f_{p2}$ and $f_{c\_UGF}$) cannot be larger than the error amplifier's gain at the same frequencies; otherwise, the error amplifier will limit the high frequency gain of compensator by pushing the poles to lower frequencies. $f_{c\_UGF}$ depends on the actual placement of poles and the gain of compensator at high frequencies, and it usually extends to a few mega-Hz. This means the error amplifier needs to have high gain-bandwidth around 10 MHz to avoid pushing the compensator's poles. To estimate the power required to achieve such a gain-bandwidth, an error amplifier model is used in FIG. 3. A transconductance amplifier 300 with output impedance $R_{o\_ea}$ is assumed here. It can be shown that $C_1+C_2$ forms the effective load to the amplifier, resulting in an effective unity gain frequency at $G_m/(C_1+C_2)$. Using the above bandwidth requirement and capacitor value, the required $G_m$ is about 2 mS. Assuming 0.2V overdrive voltage in CMOS technology, the bias current of the amplifier's input transistors is around 200 μA. This amplifier model is also put into the compensator 104 (i.e., FIG. 1). The resulting pole-zero simulation in Hspice also confirms that around 200 μA bias current is needed to maintain the desired pole locations. Hence, the power efficiency of the switching regulator at low loading current condition may be limited by the bias current of the error amplifier.

Figure 4:
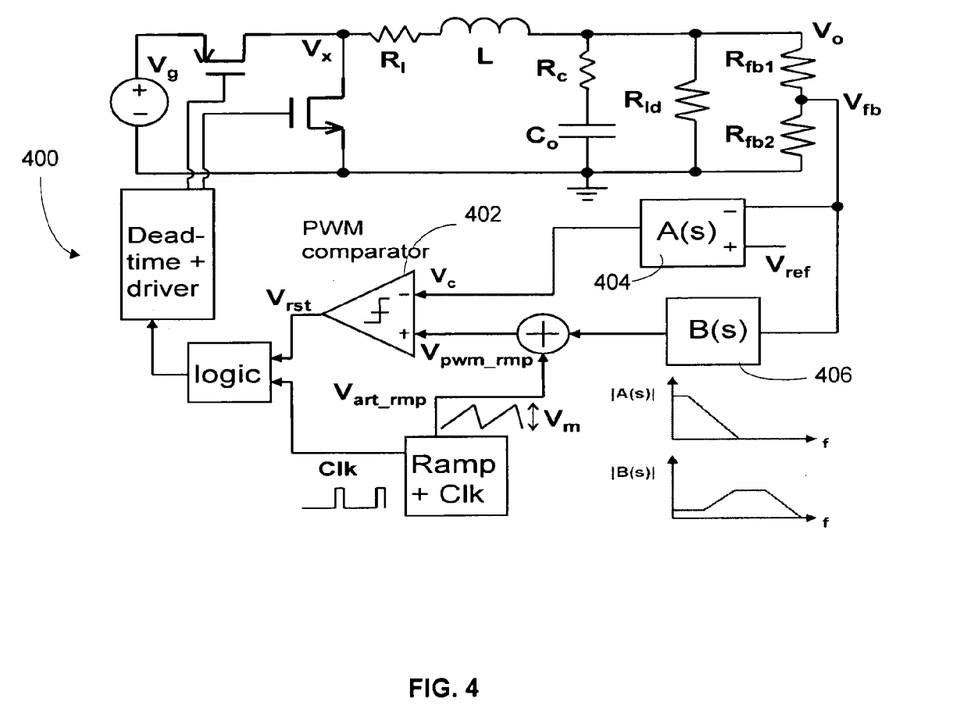
FIG. 4 is a diagram illustrating the structure of a Pseudo-Type III compensated voltage-mode Buck regulator, according to an embodiment of the present invention.

An embodiment of an improved frequency compensation method based on dual signal paths to PWM comparators is illustrated by an example of a Pseudo-Type III compensated voltage-mode Buck converter 400, as shown in FIG. 4. Many interesting new possibilities are opened up by this compensation. Before discussing them, the proposed compensation needs to be proved to have an equivalent Type III frequency response. Its block diagram is shown in FIG. 4, with the PWM comparator 402 acting as a summation circuit to two distinct filters, A(s) 404 and B(s) 406.

Figure 5:
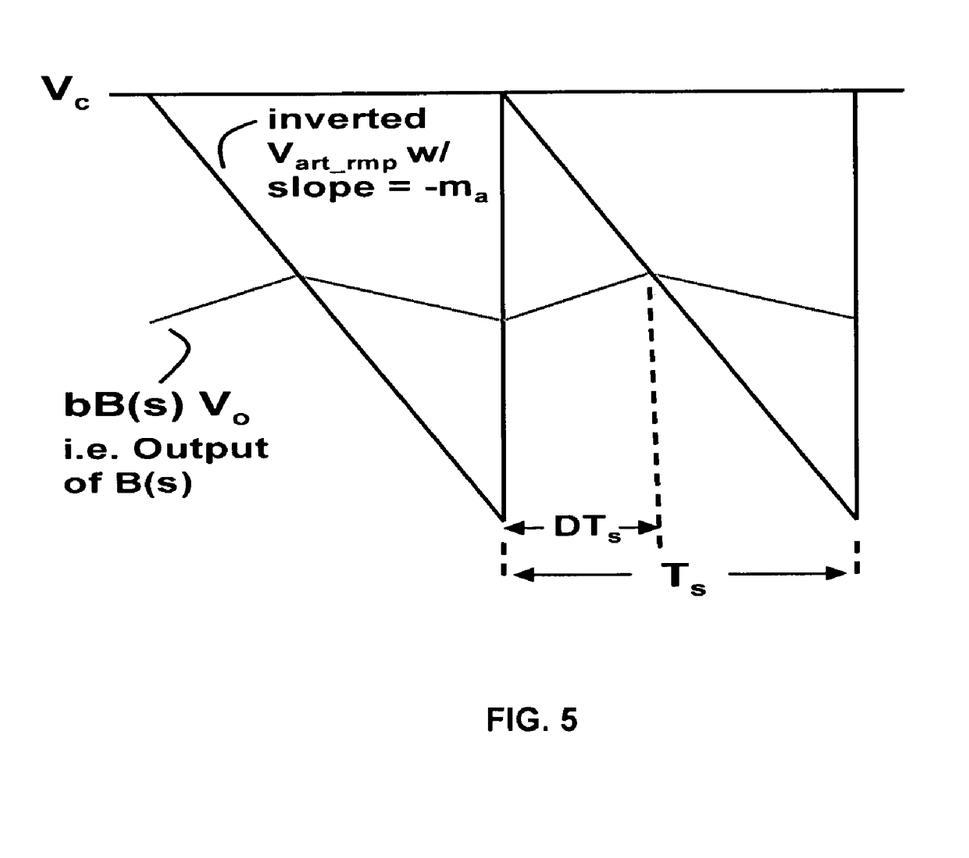
FIG. 5 is a diagram illustrating the key steady-state waveforms of the regulator according to an embodiment of the present invention.

FIG. 5 shows the key steady state waveforms. As A(s) 402 is a lowpass filter with low crossover frequency, $V_c$ is quite flat as a reference signal. On the other hand, B(s) 404 is a bandpass filter with flat gain region across the switching frequency. Hence, its output is like the switching regulator output ($V_o$) with modestly amplified ripple. In FIG. 5, D and $T_s$ are the duty-ratio and switching cycle, respectively. Scaling factor, b, is given by $R_{fb2}/(R_{fb1}+R_{fb2})$. It should be noted that an inverted $V_{art\_rmp}$ referenced at $V_c$ is shown; otherwise, the small ripple amplitude of $bB(s)V_o$ will be overwhelmed by $V_{art\_rmp}$ after addition to form $V_{pwm\_rmp}$. From FIG. 5, the control equation can be written as:

$$v_c = bv_o B(s) + m_a D T_s \quad (2)$$

Perturbing (2), and using the fact that $m_a T_s = V_m$, where $V_m$ is the amplitude of ramp signal as shown in FIG. 4, we have the following equation of perturbed quantities:

$$\hat{d} = \frac{1}{V_m}(-bB(s)\hat{v}_o + \hat{v}_c) \quad (3)$$

Figure 6:
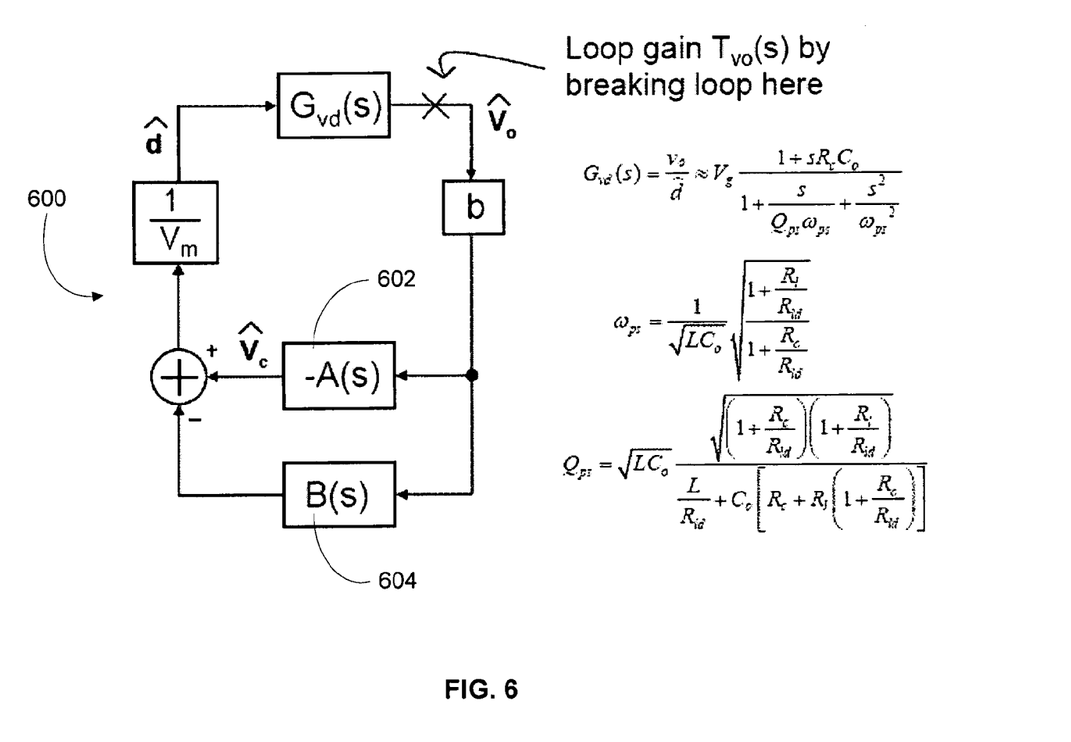
FIG. 6 is a small-signal block diagram of the regulator according to an embodiment of the present invention.

From (3), a small-signal model 600, shown in FIG. 6, can be constructed. The minus sign with A(s) block 602 is due to the fact that scaled $V_o$ is fed to the inverting input of A(s). FIG. 6 shows that the PWM comparator essentially accepts a control voltage which is the sum of outputs of A(s) 602 and B(s) 604. From FIG. 6, the loop gain by breaking the loop at $V_o$ is named $T_{vo}(s)$ and is given by:

$$T_{vo}(s) = \frac{b}{V_m} G_{vd}(s)[A(s) + B(s)] \quad (4)$$

From (4), if [A(s)+B(s)] has two zeros and three poles as the conventional Type III compensator, the proposed structure is proved to have a Type III compensator's frequency response. Owing to their lowpass and bandpass nature, A(s) and B(s) can be represented as:

$$A(s) = \frac{G_{ea}}{1 + \frac{s}{\omega_{po}}} \quad (5(a)\text{-}(b))$$

$$B(s) = \frac{G_{bpf}\left(1 + \frac{s}{\omega_{zbpf}}\right)}{\left(1 + \frac{s}{\omega_{p1}}\right)\left(1 + \frac{s}{\omega_{p2}}\right)}$$

Figure 7:
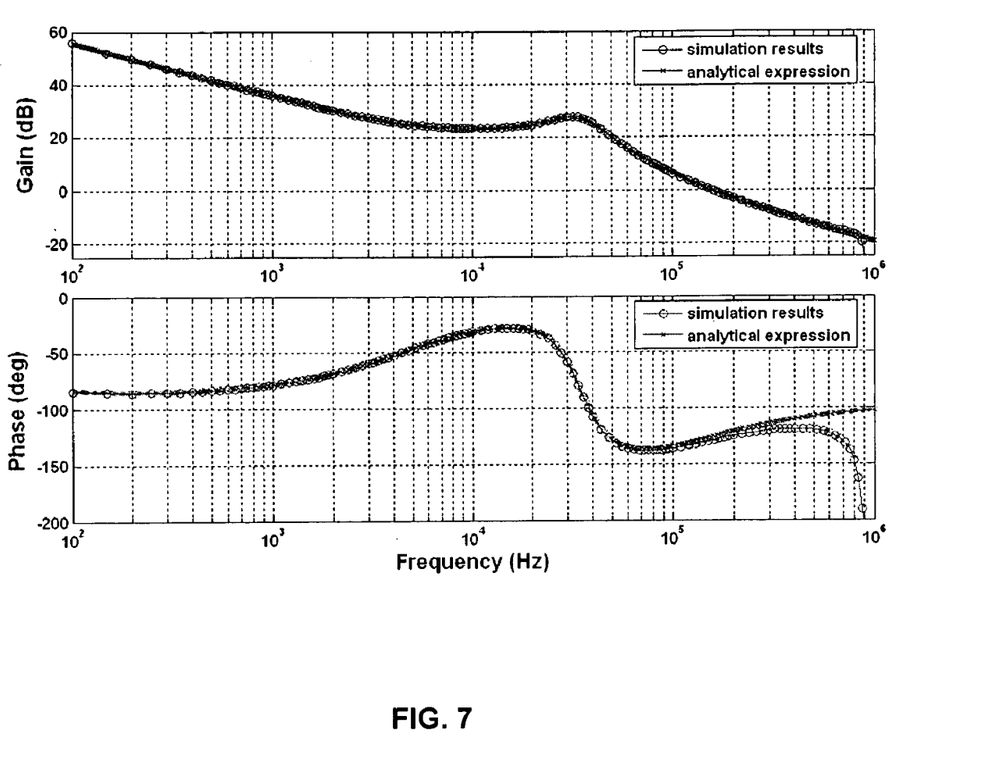
FIG. 7 is a diagram illustrating frequency responses based on simulation and analytical expressions according to an embodiment of the present invention.

Hence, it can be expected that the new "compensator", $C(s)=[A(s)+B(s)]$, will have a response of the Type III compensator. The above small-signal modeling is verified by simulating the proposed compensator in a Matlab-based switching regulator simulator as presented in "*Comparative Studies of Common Control Schemes For Reference Tracking and Application of End-Point Prediction*," IEEE Custom Integrated Circuits Conf., 2007, pp. 559-562 by Wu and Mok, which is incorporated herein by reference in its entirety. The result is shown in FIG. 7 where it can be observed that the analytical expression obtained by the above analysis matches the simulated frequency response very well, except for the phase response at very high frequencies near the switching frequency. Hence, the above modeling is accurate enough for design purpose.

Now, the proposed compensator's frequency response, C(s), is further analyzed for applications in design. The dc gain of bandpass filter, $G_{bpf}$, can be chosen as a design variable. In one implementation, it is set to unity. Then, C(s) can be expressed as:

$$C(s) = \frac{G_{ea}}{1 + \frac{s}{\omega_{po}}} + \frac{1 + \frac{s}{\omega_{zbpf}}}{\left(1 + \frac{s}{\omega_{p1}}\right)\left(1 + \frac{s}{\omega_{p2}}\right)} \quad (6)$$

It can be seen that the poles remain at $\omega_{po}$, $\omega_{p1}$, and $\omega_{p2}$. Yet, the zeros may be different as the numerator of C(s), Num[C(s)], can be written as:

$$Num[C(s)] = G_{ea}\left(1 + \frac{s}{\omega_{p1}}\right)\left(1 + \frac{s}{\omega_{p2}}\right) + \left(1 + \frac{s}{\omega_{po}}\right)\left(1 + \frac{s}{\omega_{zbpf}}\right) \approx \quad (7)$$

$$G_{ea}\left\{1 + s\left[\left(\frac{1}{\omega_{p1}} + \frac{1}{\omega_{p2}}\right) + \frac{1}{G_{ea}}\left(\frac{1}{\omega_{po}} + \frac{1}{\omega_{zbpf}}\right)\right] + s^2\left[\frac{1}{\omega_{p1}\omega_{p2}} + \frac{1}{G_{ea}}\frac{1}{\omega_{po}\omega_{zbpf}}\right]\right\}$$

assuming $G_{ea} \gg 1$. Further assuming that $G_{ea}\omega_{p0} \ll \omega_{zbpf} \ll \omega_{p1} \ll \omega_{p2}$, (7) can be written as:

$$Num[C(s)] \approx G_{ea}\left\{1 + s\left[\frac{1}{G_{ea}\omega_{p0}}\right] + s^2\left[\frac{1}{G_{ea}\omega_{p0}\omega_{zbpf}}\right]\right\} \quad (8)$$

The zeros of $C(s)$ can then be represented as:

$$\omega_{zc(s)} \approx \frac{-1}{2\frac{1}{G_{ea}\omega_{p0}\omega_{zbpf}}}\left\{-\frac{1}{G_{ea}\omega_{p0}} \pm \sqrt{\left(\frac{1}{G_{ea}\omega_{p0}}\right)^2 - 4\frac{1}{G_{ea}\omega_{p0}\omega_{zbpf}}}\right\} = \frac{\omega_{zbpf}}{2}(1 \pm \sqrt{\alpha}) \quad (9)$$

where $\alpha$ can be viewed as the factor of separation between two zeros, and it is given by:

$$\alpha = 1 - \frac{4G_{ea}\omega_{p0}}{\omega_{zbpf}} \quad (10)$$

At the first sight, it may not be straight-forward to have a feeling of where the zeros of $C(s)$ are. We can look at the limiting cases when $\alpha$ is as small as 0 and as large as 1. When $\alpha=0$ (i.e., $4G_{ea}\Omega_{p0}=\omega_{zbpf}$), both zeros of $C(s)$ lie at $\omega_{zbpf}/2$. When $\alpha=1$ (i.e., $4G_{ea}\omega_{p0} \ll \omega_{zbpf}$), one zero ($\omega_{z2\_c(s)}$) is at $\omega_{zbpf}$, while the other ($\omega_{z1\_c(s)}$) is at:

$$\omega_{z1\_c(s)} = \lim_{\omega_{zbpf} \to \infty} \frac{\omega_{zbpf}}{2}\left(1 - \sqrt{1 - \frac{4G_{ea}\omega_{p0}}{\omega_{zbpf}}}\right) = G_{ea}\omega_{p0} \quad (11)$$

Figure 8:
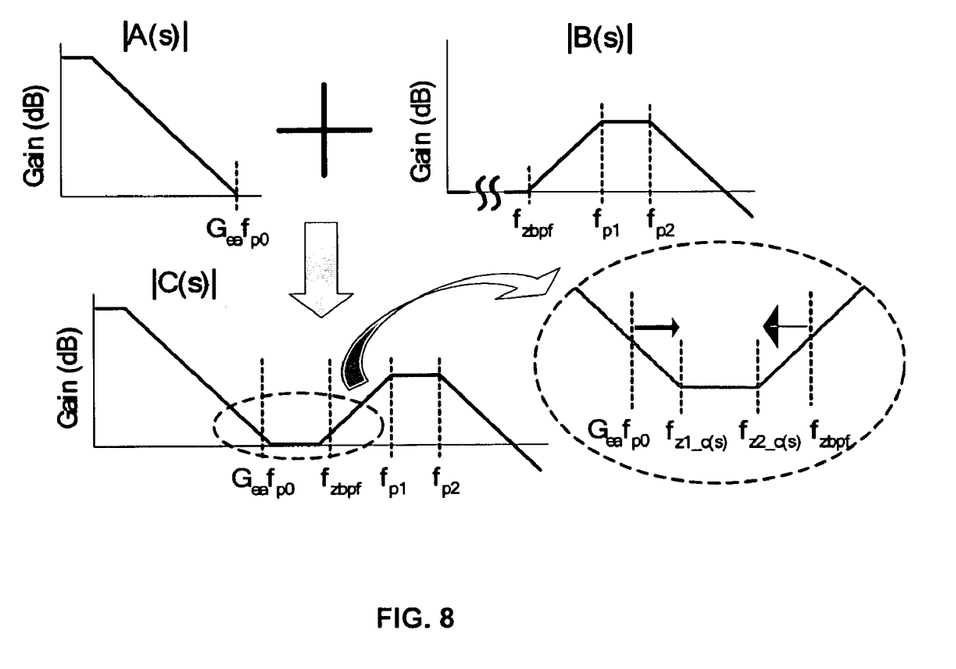
FIG. 8 is a diagram illustrating a bode plot of the compensator according to an embodiment of the present invention.

Hence, a very interesting phenomenon of the two zeros can be seen here. When the zero of bandpass filter is very far away from the gain-bandwidth of error amplifier, the two zeros of $C(s)$ are simply located at the zero of bandpass filter and the gain-bandwidth of error amplifier. When these two parameters get closer, the resultant $C(s)$ zeros attract each other; and when the two parameters are so close that $4G_{ea}\omega_{p0}=\omega_{zbpf}$, the two $C(s)$ zeros coincide with each other at $\omega_{zbpf}/2$. This "mutual attraction between zeros" is shown in the inset in FIG. 8. Another observation about $C(s)$ zeros is that complex zeros can be generated if error amplifier's gain-bandwidth is higher than a quarter of bandpass filter's zero. Yet, this is usually not recommended in design; hence posing an upper bound of error amplifier's gain-bandwidth.

From the above analysis of zeros of $C(s)$, several important findings can be applied in the design of proposed compensator. Firstly, the first zero is generated through addition of two signal paths, rather than the time constant of an explicit pair of resistor and capacitor. If we use a transconductance amplifier with capacitive load only, its gain-bandwidth ($\sim G_m/C$) roughly determines the first zero of $C(s)$. Hence, a large on-chip resistor for generating the first zero is waived. Also, the required gain-bandwidth of error amplifier in the proposed compensator is only a fraction of L-C pole frequency, which is around 2 orders of magnitude smaller than what is required in a conventional Type III compensator. A huge amount of power is then saved for the same capacitive load.

Secondly, as the second zero is attracted to lower frequency than $\omega_{zbpf}$, the size of passive components used to generate $\omega_{zbpf}$ can be reduced. Denote that the desired $C(s)$ second zero is $K_z$ times as high as the first zero; that is:

$$\omega_{z2\_c(s)} = K_z \omega_{z1\_c(s)} \quad (12)$$

Substituting (12) and (10) into (9), and after some algebra, we have:

$$\omega_{zbpf} = \omega_{z2\_c(s)}(1+1/K_z) \text{ and } G_{ea}\omega_{p0} = \omega_{z1\_c(s)}[1 - 1/(K_z+1)] \quad (13(a)-(b))$$

Hence, the time constant (i.e., ~size of passive components) to generate the second zero is reduced by $1/(K_z+1) \times 100\%$. Meanwhile, although (13(b)) shows that the first zero is shifted to higher frequency than $G_{ea}\omega_{p0}$, it is beneficial to power consumption as $G_{ea}\omega_{p0}$ is generated by $G_m/C$, but not $1/(RC)$.

Thirdly, in one implementation, we generate the first zero by $G_m/C$, and the second zero by $1/(RC)$. Robustness against process variation may be enhanced if $G_m/C$ is fixed to some precise value by some techniques such as constant $G_m/C$ biasing. Then, the effect on phase margin due to process variation of $1/(RC)$ can be reduced, since higher $1/(RC)$ moves the second pole to higher frequency, and yet moves the first pole to lower frequency at the same time due to the nature of proposed compensator. This movement of zeros is different from the conventional Type III compensator (assuming all resistors and capacitors on-chip) and may be exploited.

Figure 9:
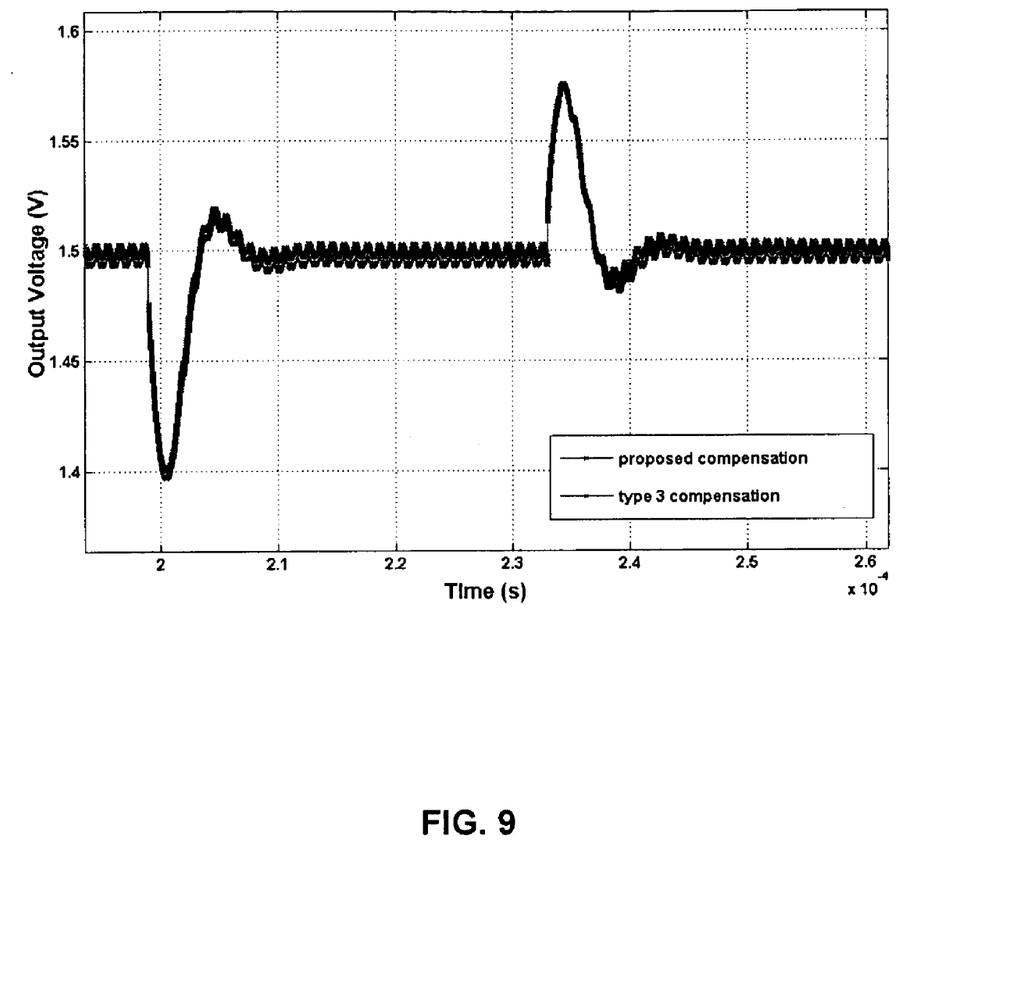
FIG. 9 is a diagram illustrating simulated load transient responses of the conventional Type-III compensated regulator and of a regulator in accordance with an embodiment of the present invention.

Finally, besides comparing the equivalence in frequency responses, transient simulation of the proposed compensator and conventional Type III compensator is also performed using the Matlab-based simulator. FIG. 9 shows that two compensators will have very similar load transient responses.

Figure 10:
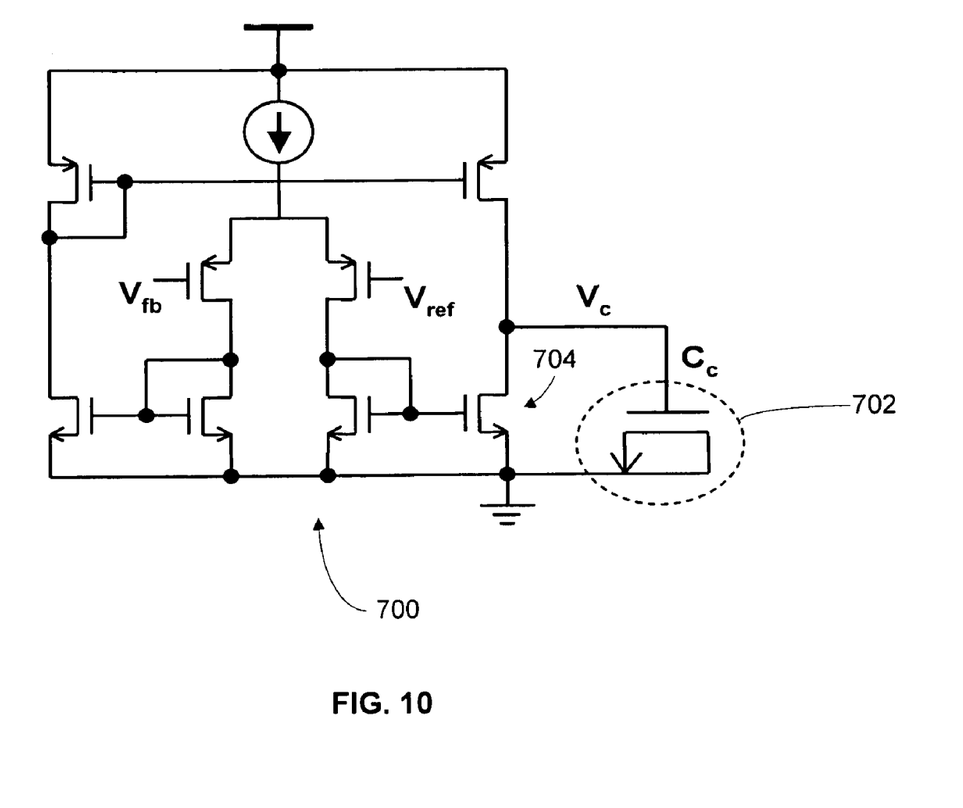
FIG. 10 is a schematic of a lowpass filter in accordance with an embodiment of the present invention.

FIG. 10 shows the current-mirror error amplifier 700 with capacitive load ($C_c$) in one implementation. The resultant gain-bandwidth is $g_{m1}/C_c$, where $g_{m1}$ is the transconductance of the input different pair. As mentioned before, the required gain-bandwidth of error amplifier in proposed compensator can be 2 to 3 orders of magnitude smaller than that of the conventional Type III compensator 104. For the same capacitive load, the power consumption ($\sim G_m$) can be reduced by the same orders of magnitude. As previously mentioned, $C_2$ is the dominant effective load of conventional Type III compensator 104. For easy comparison, $C_c$ is chosen to be roughly the same ($\sim$100 pF). $G_{m1}$ is 2.9 µA/V $\sim$1/690 of conventional Type III amplifier) and the bias current required is only 200 nA. Consequently, the gain-bandwidth of proposed error amplifier 700 is around 4.6 kHz.

It is still area-consuming to keep $C_c$ as large as 100 pF. Hence, it is implemented in the form of MOS capacitor 702 in strong inversion by shorting the source, drain and bulk terminals of NMOS transistor 704. The capacitance per unit area of MOS capacitor 702 is 5 times as large as that of poly-poly capacitor in a certain process. As a result, $C_c$ only occupies 20% of the area of $C_2$ in conventional Type III compensator 104. This approach is feasible in the proposed compensation as error amplifier output is very stable and its dc value is determined by the sum of $V_{art\_rmp}$ and scaled $V_o$, as implied in FIG. 5. Hence, a minimum voltage of ramp signal can be set to ensure that a gate voltage higher than threshold voltage is applied to the MOS capacitor 702. On the contrary, in conventional Type III compensator 104, linear poly-poly capacitor must be used to implement $C_2$ due to the wide dynamic range and fast-moving nature of error amplifier output.

With the first zero being placed in quite low frequency compared with the L-C pole frequency, the second zero can be placed farther beyond the L-C pole frequency to reduce the size of passive components of bandpass filter while phase margin of loop gain can be maintained. In addition, the employment of proposed Pseudo-Type III structure also pushes $f_{zbpf}$ to higher frequency. Finally, $f_{zbpf}$ is chosen to be 132 kHz and the resultant loop gain bode plot has already been shown in FIG. 7. $f_{p1}$ is placed around $f_{esr}$ to ensure good gain margin beyond loop gain crossover frequency, and $f_{p2}$ can be placed farther quite arbitrarily.

Figure 11:
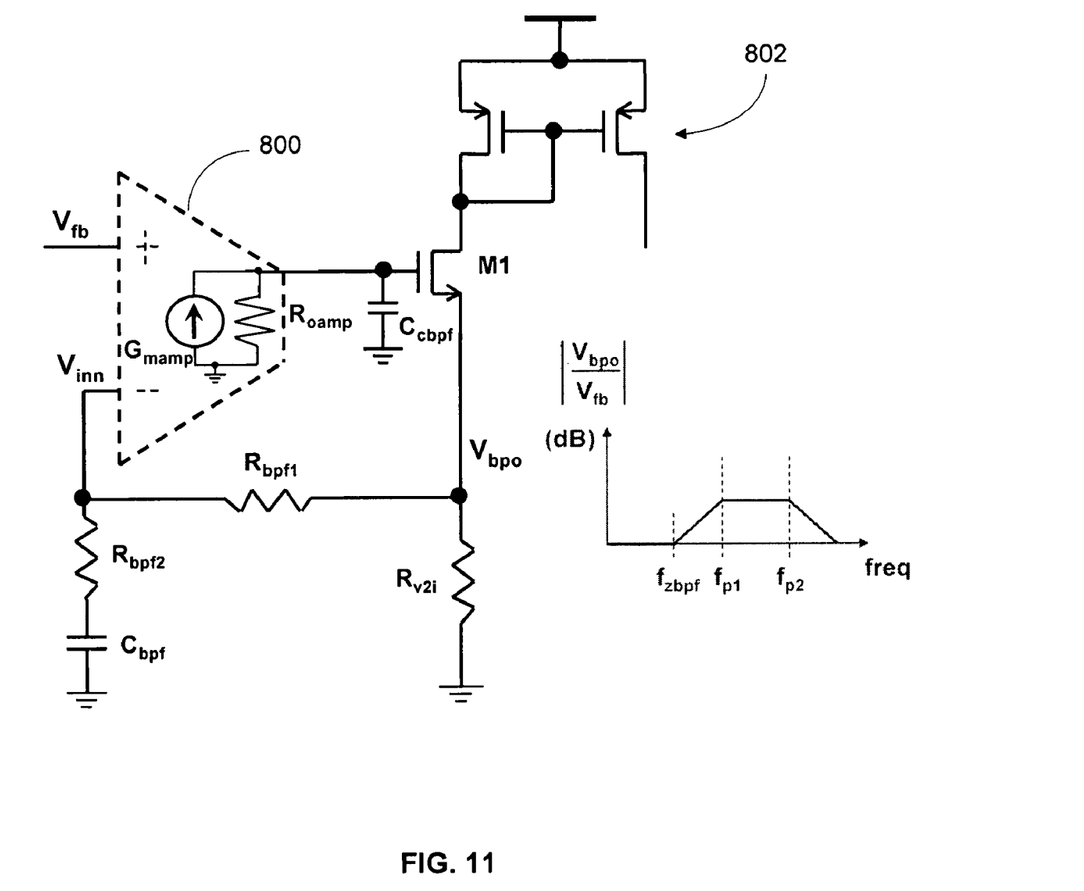
FIG. 11 is a schematic of a bandpass filter in accordance with an embodiment of the present invention.

FIG. 11 shows the proposed bandpass filter and the adder (as shown in FIG. 4) in the form of a voltage-to-current (v-to-i) converter. Independently, the amplifier, M1, $R_{bpf1}$, $R_{bpf2}$, and $C_{bpf}$ form the bandpass filter, while the amplifier, M1, and $R_{v2i}$ constitute the v-to-i converter. In one implementation, the amplifier 800 and M1 are reused and the filter and adder are combined to save power. Only 26 µA current is used in total. The filter accepts input from $V_{fb}$, and its output is at $V_{bpo}$; while the PMOS current mirror 802 copies the filter output signal current to add with the artificial ramp current. M1 behaves like a unity gain source follower around the filter loop, and gives a low impedance at $V_{bpo}$. With this in mind, the transfer function of filter can be written as:

$$B(s) = \frac{V_{bpo}}{V_{fb}} = \frac{1 + s(R_{bpf1} + R_{bpf2})C_{bpf}}{\left(1 + \frac{1}{G_{bpA}}\right)s\left(R_{bpf2}C_{bpf} + \frac{1}{G_{bpA}\omega_{obpA}} + \frac{(R_{bpf1} + R_{bpf2})C_{bpf}}{G_{bpA}}\right) + s^2\frac{(R_{bpf1} + R_{bpf2})C_{bpf}}{G_{bpA}\omega_{obpA}}} \quad (14)$$

where dc gain and 3-dB bandwidth of amplifier ($G_{bpA}$, and $\omega_{obpA}$) are given by:

$$G_{bpA} = G_{mamp}R_{oamp} \text{ and } \omega_{bpA} = R_{oamp}C_{cbpf} \quad (15(a)\text{-}(b))$$

It can be proven that for $G_{bpA}R_{bpf2}/(R_{bpf1}+R_{bpf2}) \gg 1$, (14) can be approximated as:

$$B(s) \approx \frac{1 + s(R_{bpf1} + R_{bpf2})C_{bpf}}{(1 + sR_{bpf2}C_{bpf})\left(1 + s\frac{1}{G_{bpA}\omega_{bpA}}\frac{R_{bpf1} + R_{bpf2}}{R_{bpf2}}\right)} \quad (16)$$

Hence, for the system, $\omega_{zbpf}$, $\omega_{p1}$, and $\omega_{p2}$ are given by:

$$\omega_{bpf} = \frac{1}{(R_{bpf1} + R_{bpf2})C_{bpf}}, \omega_{p1} = \frac{1}{R_{bpf2}C_{bpf}}, \quad (17)$$

and $$\omega_{p2} = G_{bpA}\omega_{obpA}\frac{R_{bpf2}}{R_{bpf1} + R_{bpf2}}$$

Eq. (17) shows that in the proposed bandpass filter, passive components set the zero and first pole frequency, while the second pole is determined by the gain-bandwidth of amplifier 800 and the ratio of resistances (which is also the ratio of zero and first pole frequencies). Since the amplifier 800 only drives the gate of a small source follower M1, even with a small bias current of 4 µA, $f_{p2}$ can be as high as tens of mega-Hz. Such a high $f_{p2}$ seems rarely seen in typical Type III compensator design. Yet, it does not affect the noise sensitivity much, as the gain in pass-band of proposed bandpass filter is already set to a modest value of 15 dB by the choice of $f_{zbpf}$ and $f_{p1}$. On the other hand, a high $f_{p2}$ can help the faster settling of the high frequency signals. The final chosen $R_{bpf1}$, $R_{bpf2}$, $C_{bpf}$ and $C_{cbpf}$ are 100 kΩ, 20 kΩ, 10 pF, and 70 fF, respectively. Compared to the values of $R_1$ and $C_3$ in conventional Type III compensator, about 75% of area is saved.

Figure 12:
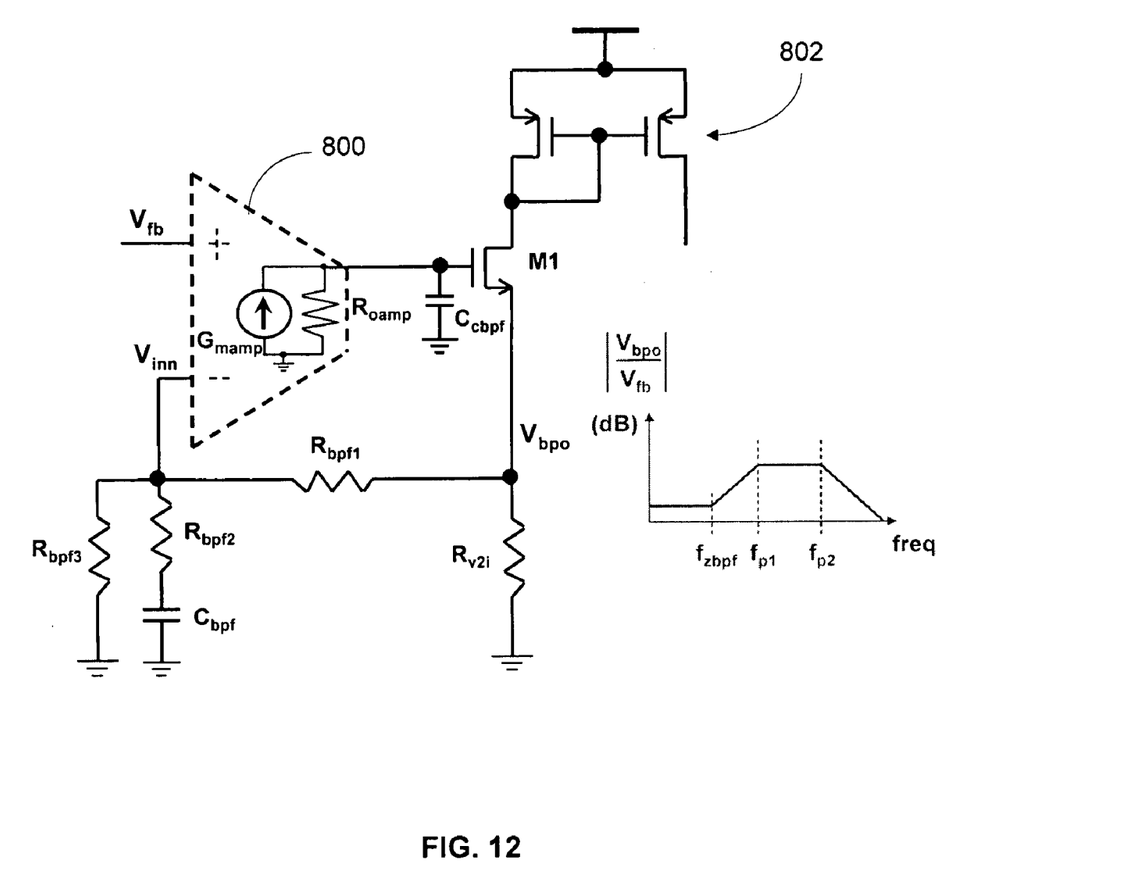
FIG. 12 is a schematic of a bandpass filter in accordance with another embodiment of the present invention.

FIG. 12 shows another implementation of bandpass filter which will be useful when a dc gain larger than unity is desired. The ratio between $R_{bpf1}$ and $R_{bpf3}$ forms the dc gain of the bandpass filter.

While the invention has been described above by reference to various embodiments, it will be understood that changes and modifications may be made without departing from the scope of the invention. For example, while the above descriptions describe a lowpass filter with a dominant pole only, the incorporation of a zero and/or a pole at higher frequencies is possible. The similar modification on number and locations of the poles and zeros of the bandpass filter is also possible to give the desired compensator's frequency response. Moreover, the dual signal paths to the PWM comparator is only described for the most typical cases, and the inclusion of more signal paths to PWM comparator is also possible if the PWM comparator incorporates more input terminals.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A voltage-mode switching regulator having an on-chip compensator for frequency compensation, the regulator comprising:

a power stage including two or more power semiconductor devices, said stage providing a regulator output in response to an input voltage;

a controller for controlling the power to the power semiconductor devices;

a PWM comparator for generating a Type III frequency response having at least a first and second inputs;

a lowpass filter receiving as inputs a reference voltage and a signal indicative of the regulator output and providing a first single-ended output coupled to the first input of the PWM comparator; and a bandpass filter receiving as input a signal indicative of the regulator output and providing a second single-ended output coupled to the second input of the PWM comparator.

2. The voltage-mode switching regulator of claim 1 wherein said lowpass filter comprises a single capacitor connected between an output of a transconductance amplifier and ground to form a dominant pole in a frequency response of the on-chip compensator.

3. The voltage-mode switching regulator of claim 1 wherein said bandpass filter comprises:

an amplifier, a buffer transistor, a PMOS current mirror, a first resistor, a second resistor, a third resistor, and a capacitor, the amplifier having a non-inverting input for receiving a scaled version of the regulator output voltage and driving a gate of a buffer transistor;

a drain terminal of the buffer transistor coupled to an input terminal of the PMOS current mirror, and a source terminal of the buffer transistor coupled to a first terminal of the first resistor;

a second terminal of the first resistor coupled to ground; and wherein the second resistor is coupled between the source terminal of the buffer transistor and an inverting input of the amplifier, the third resistor is coupled between the inverting input of the amplifier and a first terminal of the capacitor, and a second terminal of the capacitor is coupled to the ground.

4. The voltage-mode switching regulator of claim 3 wherein a fourth resistor is coupled between the inverting input of the amplifier and the ground.

5. The voltage-mode switching regulator of claim 1, wherein the power stage utilizes voltage-mode control and the regulator output is a voltage signal.

6. A voltage-mode switching regulator having an on-chip compensator for frequency compensation, the regulator comprising:

a power stage including two or more power semiconductor devices, said stage providing a regulator output in response to an input voltage;

a controller for controlling the power to the power semiconductor devices;

a PWM comparator for generating a Type III frequency response having at least a first and second inputs;

a lowpass filter receiving as inputs a reference voltage and a signal indicative of the regulator output and providing a first single-ended output coupled to the first input of the PWM comparator; and a highpass filter receiving as input a signal indicative of the regulator output and providing a second single-ended output coupled to the second input of the PWM comparator.

7. The voltage-mode switching regulator of claim 6 wherein the highpass filter comprises a first-order R-C passive network.

8. The voltage-mode switching regulator of claim 6, wherein the power stage utilizes voltage-mode control and the regulator output is a voltage signal.

9. A method for regulating an input voltage by means of a voltage-mode switching regulator having an on-chip compensator for frequency compensation, the method comprising:

providing, via a power stage of said regulator, a regulator output in response to the input voltage, said regulator further comprising a PWM comparator;

receiving a reference voltage and a signal indicative of the regulator output as inputs to a lowpass filter;

generating a slow-varying error voltage signal from the reference voltage and the signal indicative of the regulator output for a first input of the PWM comparator;

generating a fast-varying transient detecting signal from the signal indicative of the regulator output for a second input of the PWM comparator; and generating, at the PWM comparator, a Type III frequency response.

10. The method of claim 9, further comprising connecting a single capacitor connected between a transconductance amplifier output and ground of said regulator to form a dominant pole in a frequency response of the on-chip compensator.

11. The method of claim 9, wherein said regulator further comprises a bandpass filter, the method further comprising:

providing, for said bandpass filter, an amplifier, a buffer transistor, a PMOS current mirror, a first resistor, a second resistor, a third resistor, and a capacitor, the amplifier having a non-inverting input for receiving a scaled version of the regulator output voltage and driving a gate of a buffer transistor;

providing, for said bandpass filter, a drain terminal of the buffer transistor coupled to an input terminal of the PMOS current mirror, and a source terminal of the buffer transistor coupled to a first terminal of the first resistor;

providing, for said bandpass filter, a second terminal of the first resistor coupled to ground;

coupling the second resistor between the source terminal of the buffer transistor and an inverting input of the amplifier;

coupling the third resistor between the inverting input of the amplifier and a first terminal of the capacitor; and coupling a second terminal of the capacitor to the ground.

12. The method of claim 11 further comprising coupling a fourth resistor between the inverting input of the amplifier and the ground.

13. The method of claim 9 further comprising providing a highpass filter for said regulator.

14. The method of claim 13 wherein the highpass filter comprises a first-order R-C passive network.

15. The method of claim 9, wherein the power stage utilizes voltage-mode control and the regulator output is a voltage signal.

* * * * *